(12) United States Patent
Wienand et al.

(10) Patent No.: US 7,739,908 B2
(45) Date of Patent: Jun. 22, 2010

(54) FLOW SENSOR ELEMENT AND ITS SELF-CLEANING

(75) Inventors: Karlheinz Wienand, Aschaffenburg (DE); Karlheinz Ullrich, Gross-Umstadt (DE); Matthias Muziol, Mainhausen (DE)

(73) Assignee: Heraeus Sensor Technology GmbH, Hanau (DE)

( * ) Notice: Subject to any disclaimer, the term of this patent is extended or adjusted under 35 U.S.C. 154(b) by 0 days.

(21) Appl. No.: 12/108,878

(22) Filed: Apr. 24, 2008

(65) Prior Publication Data
US 2008/0264166 A1 Oct. 30, 2008

Related U.S. Application Data

(63) Continuation of application No. PCT/EP2006/010232, filed on Oct. 24, 2006.

(30) Foreign Application Priority Data
Oct. 24, 2005 (DE) .................. 10 2005 051 182
Jun. 30, 2006 (DE) .................. 10 2006 030 786

(51) Int. Cl.
G01F 1/68 (2006.01)
(52) U.S. Cl. .................................. 73/204.26
(58) Field of Classification Search .. 73/204.26–204.28
See application file for complete search history.

(56) References Cited

U.S. PATENT DOCUMENTS

| | | | |
|---|---|---|---|
| 4,658,641 A | 4/1987 | Drews et al. | |
| 4,833,912 A | 5/1989 | Ohta et al. | |
| 4,976,145 A | 12/1990 | Kienzle et al. | |
| 5,247,156 A | 9/1993 | Favre | |
| 5,321,386 A | 6/1994 | Ishiguro | |
| 7,021,136 B2 * | 4/2006 | Vincze et al. | 73/204.26 |
| 7,395,707 B2 * | 7/2008 | Watanabe et al. | 73/204.26 |

(Continued)

FOREIGN PATENT DOCUMENTS

DE 3040448 A1 5/1982

(Continued)

OTHER PUBLICATIONS

German Office Action dated Feb. 23, 2010 of German Patent Application No. DE 10 2005 051 182.1.

*Primary Examiner*—Jewel Thompson
(74) *Attorney, Agent, or Firm*—Panitch Schwarze Belisario & Nadel LLP

(57) ABSTRACT

A flow sensor element and a method for self-cleaning of the flow sensor element are provided, in which a temperature-measuring element and a heating element are arranged on a carrier element, and these elements can form a multiple-part ceramic component. The temperature-measuring element has a platinum thin-film resistor on a ceramic substrate for the temperature measurement and is heated with an additional platinum thin-film resistor. A measurement device, in particular an anemometric measurement device of a flow sensor, contains film resistors mounted in at least one opening of a cover or a hollow body. Two of the film resistors have resistance values differing by one to three orders of magnitude. The anemometric measurement device has a temperature sensor and a heat output sensor set in a carrier element. The temperature sensor has a temperature-measuring resistor and a heat conductor, as platinum thin-film or thick-film resistors, on a ceramic substrate.

20 Claims, 13 Drawing Sheets

U.S. PATENT DOCUMENTS

2009/0158859 A1 * 6/2009 Huang et al. ............ 73/861.351

FOREIGN PATENT DOCUMENTS

| | | | |
|---|---|---|---|
| DE | 3433368 | A1 | 3/1986 |
| DE | 195 06 231 | A1 | 8/1995 |
| DE | 3844354 | C2 | 11/1995 |
| DE | 4331722 | C2 | 5/1997 |
| DE | 199 41 420 | A1 | 4/2000 |
| DE | 101 24 964 | A1 | 12/2002 |
| DE | 102 25 602 | A1 | 1/2004 |
| DE | 102005051182 | A1 | 4/2007 |
| EP | 1 065 476 | A1 | 1/2001 |
| EP | 1065476 | A1 | 1/2001 |
| EP | 1099939 | A2 | 5/2001 |
| EP | 1106797 | A1 | 6/2001 |
| EP | 1431718 | A2 | 6/2004 |
| JP | 61122559 | | 6/1986 |

* cited by examiner

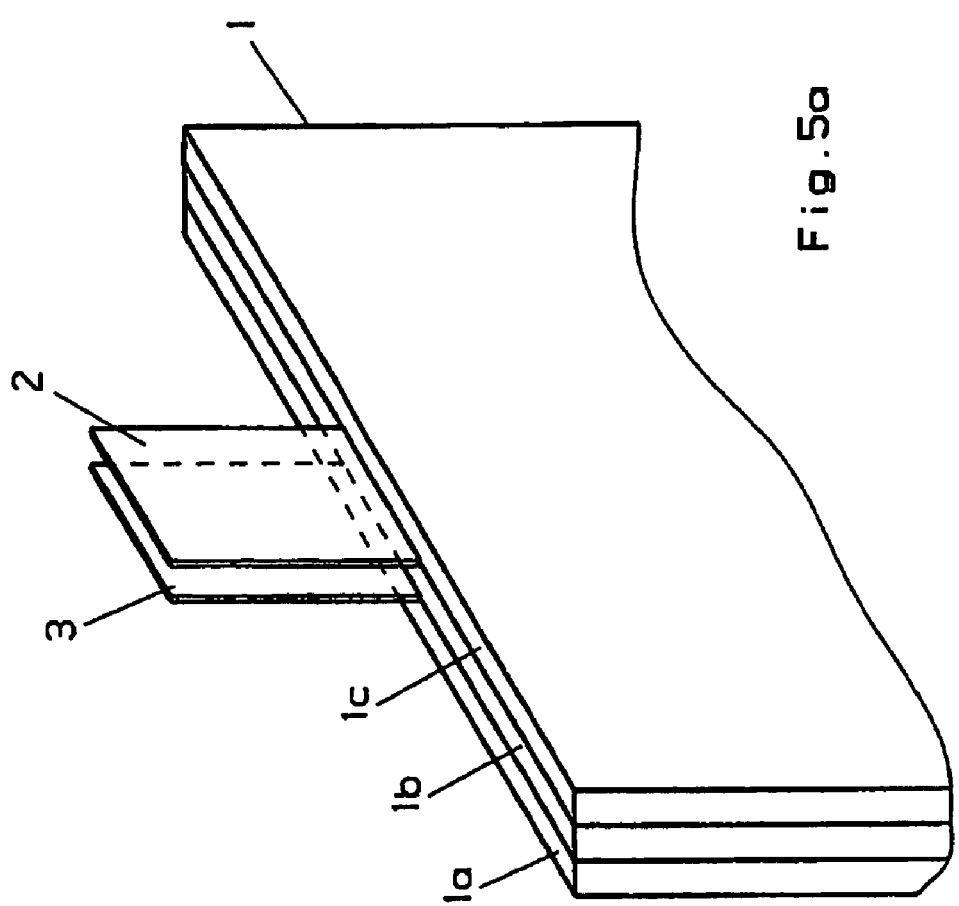
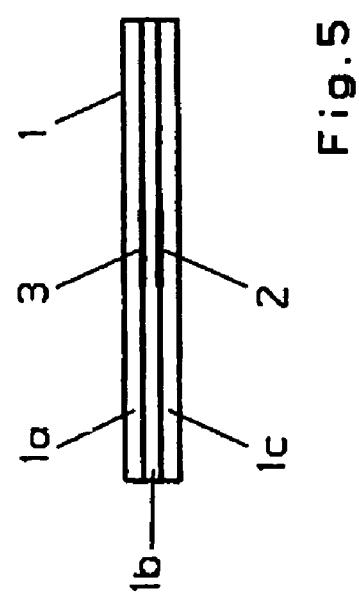

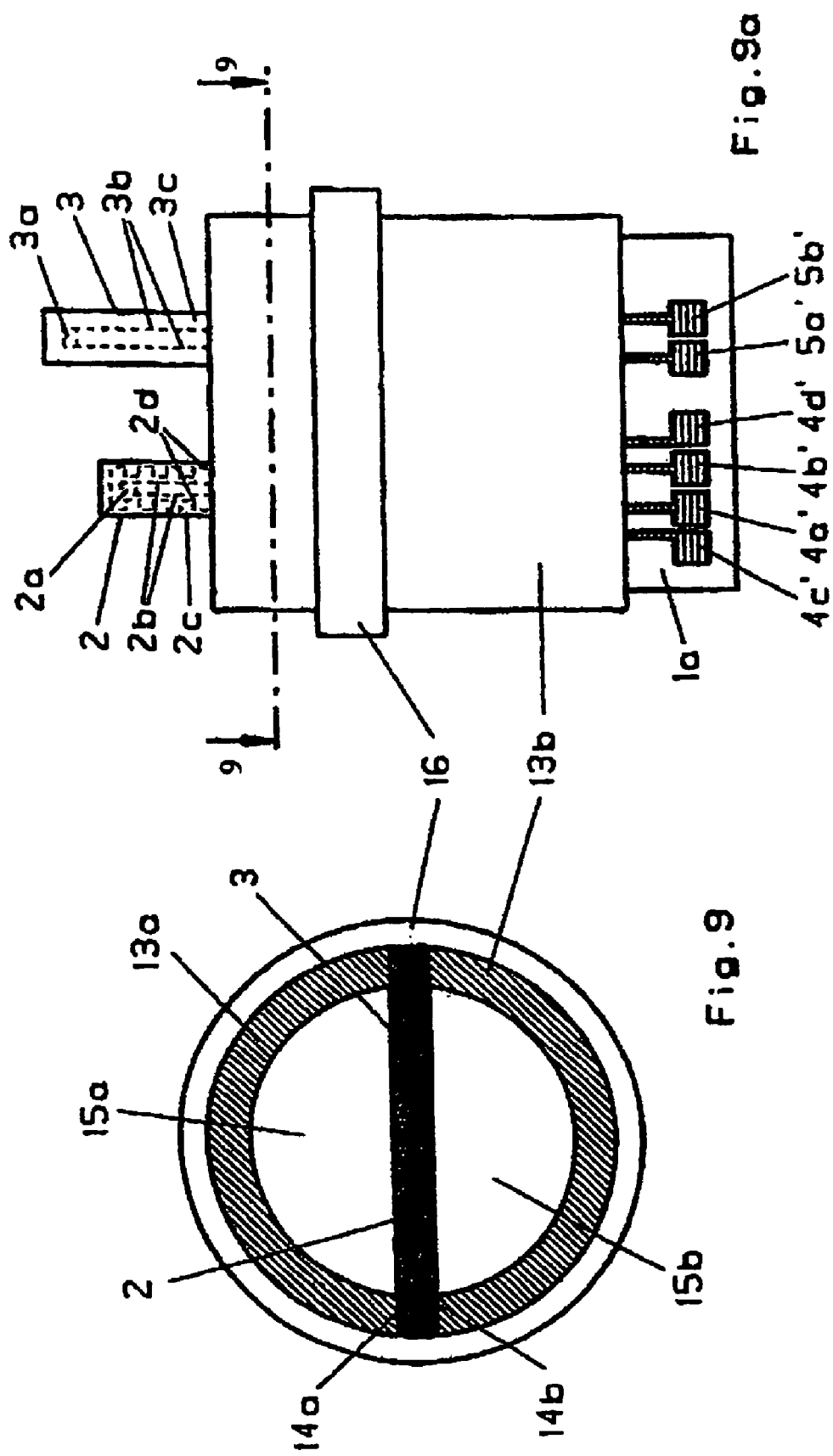

FLOW SENSOR ELEMENT AND ITS SELF-CLEANING

CROSS-REFERENCE TO RELATED APPLICATIONS

This application is a Continuation of International Application No. PCT/EP2006/010232, filed Oct. 24, 2006, which was published in the German language on May 3, 2007, under International Publication No. WO 2007/048573 A1 and the disclosure of which is incorporated herein by reference.

BACKGROUND OF THE INVENTION

The invention relates to a flow sensor element having film resistors, in particular having a temperature sensor based on a platinum thin-film resistor and a heat output sensor based on a platinum thin-film resistor. Advantageously, the temperature sensor and the heat output sensor are arranged on a carrier element. Electrically conductive tracks and connection surfaces for the electrical contacting of temperature sensors and heat output sensors arranged on a ceramic substrate have proven effective. In addition, the invention relates to the production and application of such a flow sensor element.

Such flow sensor elements are known from European patent application publication EP 1 065 476 A1. There, a thermal air flow sensor is disclosed, in which a sensor element having a heating resistor and a resistive temperature-measuring element is arranged countersunk in a recess of a ceramic laminate body and fixed with ceramic cement. Due to the adhesive bond and the countersunk arrangement of the sensor element with or in the ceramic laminate, the sensor element exhibits marked reactive inertness for changes in temperature of the measurement medium. The electrical contacts are covered in the flow region with an epoxy resin, so that the device cannot be used at temperatures above 300° C. In addition, the arrangement is complicated and therefore cost-intensive.

German published patent application DE 102 25 602.0 discloses a temperature sensor having a total thickness of 10 to 100 µm, which has a metallic film substrate with an electrically insulating coating, on which a platinum thin-film resistor is arranged as a temperature-sensitive element. The temperature sensor is used in the region of a cooling body for a semiconductor component.

German published patent application DE 195 06 231 A1 discloses a hot-film anemometer having a temperature sensor and a heat output sensor. The heat output sensor is arranged like a bridge in a recess of a plastic carrier plate. The platinum temperature thin-film elements for the temperature sensor and for the heat output sensor are arranged on a ceramic substrate, which is advantageously formed from aluminum oxide.

German published patent application DE 199 41 420 A1 discloses a sensor element for temperature measurement on a metallic substrate, which has an insulation layer as a membrane. Here, the membrane spans a recess in the metallic substrate. The platinum thin film is here arranged on the membrane in the region of the recess.

German published patent application DE 101 24 964 A1 discloses a sensor for measuring flow rates of gases or liquids, the sensor having a carrier membrane constructed in the form of a flag. The carrier membrane is advantageously formed of a plastic and features an electrically conductive track made of platinum and electrical feed lines. The use of such a sensor having a carrier membrane made of plastic is not possible above 300° C.

European patent application publication EP 1 431 718 discloses a quick-response flow sensor element for measuring mass flow rates of hot gaseous or fluid media. For this purpose, a temperature-measuring element and a heating element each have a metallic carrier film with an electrically insulating coating, on which the platinum thin-film resistors are arranged. Contamination causes the measured value to drift.

BRIEF SUMMARY OF THE INVENTION

The problem of the invention is now to arrange flow sensors in exhaust-gas returns for mass production in a suitable way, advantageously to counteract the drift, in particular to clean a corresponding flow sensor element, or to keep functionally stable a flow sensor element exposed to strong contamination, such as exhaust gas.

According to one aspect of the invention, the problem is solved by a flow sensor element and a method for self-cleaning of the flow sensor element, in which a temperature-measuring element and a heating element are arranged on a carrier element, and in which the temperature-measuring element has a platinum thin-film resistor on a ceramic substrate for measuring temperature and is heated with an additional platinum thin-film resistor.

According to another aspect of the invention, the problem is solved by a flow sensor element and a method for self-cleaning of the flow sensor element, in which a temperature-measuring element and a heating element are fixed in an opening of a cover or a hollow body surface, and in which the temperature-measuring element has a platinum thin-film resistor on a ceramic substrate for measuring temperature and is heated with an additional platinum thin-film resistor.

According to a further aspect of the invention, the problem is solved by a measurement device, particularly an anemometric measurement device of a flow sensor, containing film resistors made of a carrier having an electrically insulating surface and structured resistive films arranged on this surface in one or more opening(s) of a cover or a hollow body end side, wherein the film resistors are fixed in the opening or openings and wherein two film resistors differ by one to three orders of magnitude with respect to their resistance values, and by a method for self-cleaning the anemometric measurement device.

An important aspect of the present invention is the self-cleaning of the temperature-measuring element through calcination by a heat conductor. Preferably this heat conductor is integrated on the chip of the temperature-measuring element. In a preferred construction, at least two platinum thin-film resistors are arranged on a ceramic carrier plate. This allows heating of the temperature-measuring element for burning off or calcining contaminants.

In particular the two resistors of the temperature-measuring element are arranged on a ceramic substrate, advantageously on a solid ceramic plate.

If the flow sensor element is constructed as a multiple-part ceramic component, this also allows outside action for cleaning the temperature element in addition to the preferred self-cleaning of the temperature-measuring element. Examples for cleaning by outside actions are irradiation, chemical treatment, and heat transfer within the flow sensor element, as well as combinations of these actions. As ceramic components of the multiple-part ceramic component, in addition to the carrier part, which is advantageously already assembled as a laminate, the temperature-measuring element and the heating element are also taken into consideration. In a much preferred way, the carrier part is constructed as a cover or as a side or face of a hollow body, preferably its end side. Instead of a ceramic carrier, the resistors can also be arranged on a ceramic substrate on an alternative carrier.

It is advantageous if the temperature-measuring element has rectangular ceramic carrier plates with two long and two narrow edges and if the ceramic carrier plates are arranged in the region of one of the narrow edges between ceramic films of the ceramic film laminate or between at least two parts of the ceramic component.

Likewise it is advantageous if the one or more heating elements have rectangular ceramic carrier plates with two long and two narrow edges and if the ceramic carrier plates are arranged in the region of one of the narrow edges between ceramic films of the ceramic film laminate or between at least two parts of the ceramic component.

In a much preferred way, the temperature-measuring element or the one or more heating elements have a rectangular ceramic carrier plate with two long and two narrow edges, wherein the ceramic carrier plates are arranged in openings of a cover or a hollow body end side.

The platinum thin-film resistors are here arranged advantageously on the end of the carrier plate facing away from the ceramic film laminate or the ceramic components, in order to guarantee the lowest possible thermal effect of the platinum thin-film resistors through the thermally inactive ceramic film laminate or the thermally inactive ceramic components.

To prevent a mutual effect of the temperature-measuring element and heating element, it is advantageous if the platinum thin-film resistor of the heating element is arranged farther away from the ceramic film laminate or from the ceramic component than the platinum thin-film resistor of the temperature-measuring element. In this way, the platinum thin-film resistors of the heating element are not arranged in the same flow thread of the measurement medium as the platinum thin-film resistor of the temperature-measuring element.

According to the invention, in an especially preferred way, an anemometric measurement device is also provided, in which film resistors in a cover or a hollow body are fixed in an opening or in openings of the cover or hollow body, wherein two resistors differ by one to three orders of magnitude.

The resistor that is greater by one to three orders of magnitude is suitable as a temperature-measuring resistor and is designated below as such. The resistors that are smaller by one to three orders of magnitude relative to the temperature-measuring resistor are suitable for the heating. With respect to these heating resistors, various functions are distinguished in the scope of the present invention:

Heating resistors for the self-cleaning of the temperature sensor as a component of the temperature sensor; and Heating resistors as heat output sensors for determining a mass flow according to the anemometric principle.

Heat output sensors having two heat conductors allow the direction of the mass flow to be determined. Heat output sensors having an additional temperature-measuring resistor allow a precise temperature adjustment of the heat output sensor. The present invention here relates exclusively to film resistors, which have a thick-film or thin-film construction, advantageously in platinum, preferably as a platinum thin film. The film resistors are arranged on a carrier material, preferably on a ceramic substrate. The ceramic substrate can be constructed as a carrier or can be arranged on a carrier, such as a metal plate. In usage, film resistors deposited on a carrier material are similarly designated as film resistors, so that there is no difference in terminology between film resistors in the strict sense as the pure resistive film and film resistors including the carrier material. The film resistors set in openings of a cover or a hollow body include the carrier material, on which the thinner thick film is arranged as the resistive film.

In a preferred construction, the film resistors are arranged in the strict sense on a ceramic substrate. Various film resistors in the broad sense can be arranged one next to the other in an opening of a cover or hollow body or else separately each in one opening. Advantageously, heat output sensors and temperature sensors are spaced apart from each other. Two heat conductors of a heat output sensor are advantageously arranged one behind the other, so that they lie one behind the other in the flow direction. Advantageously, heat output sensors are constructed having two heat conductors on a common substrate or having two identical chips arranged one after the other.

The openings of the cover or hollow body are advantageously slots or boreholes.

The cover is provided for the tight closure of a pipe. If the cover is made of metal, it can be welded to a metal pipe. The film resistors in the broad sense are guided through the opening or the openings of the cover and fixed in the opening or in the openings on the cover. The hollow body is used for holding the connections of the film resistors, whose sensitive part projects out of the hollow body through the opening or the openings.

An important aspect of the present invention is that resistors generated in thick film or thin film are integrated to form a sensor element that can be installed easily in mass production in an exhaust-gas channel. The solution according to the invention to set film resistors in a cover or hollow body allows simple sealing of the cover or hollow body both with respect to the carrier material of the resistors and also the material of the exhaust-gas channel.

In this way, according to the invention it is achieved that the film resistors can be constructed perpendicular to the base surface area of a cover or hollow body. This produces production-specific advantages relative to an arrangement continued parallel to a plate. Here, the invention is not restricted to a perpendicular construction, but instead allows arbitrary angles to the surface of the cover or hollow body. As an essential inventive advantage, the vertical component of angles can be constructed according to the present invention. Accordingly, the advantage of the present invention appears especially at angles from 60 to 90 degrees, preferably from 80 to 90 degrees.

In preferred constructions:

the hollow body is open on one side, preferably constructed as a pipe closed on one side;

the cover is constructed as a disk;

the base surface area of an opening for holding at least two film resistors is smaller by at least one order of magnitude than the cover surface area or a corresponding hollow body surface area;

the cover or the hollow body has two openings for holding film resistors;

the cover is made of ceramic material;

the film resistors held on the ceramic carrier material are fixed in the opening of a ceramic cover, preferably a ceramic disk with glass solder;

the film resistors carried on a ceramic substrate are fixed in at least one opening of a metal cover or hollow body, preferably a metal disk welded on a metal pipe with a sealing compound or glass;

the two resistors of the temperature-measuring element lie in one plane;

the smaller angle (heater $2d$) frames the larger resistor ($2a$) for the temperature measurement.

The measurement device according to the invention is suitable for flow sensors or carbon-particulate sensors.

The flow sensor element is operated with the film resistors according to the anemometric principle. According to the invention, a temperature sensor is equipped with a heat conductor as part of an anemometric measurement device. In this way, cleaning of the temperature sensor through calcination is enabled by a heater. It has proven effective in the anemometric measurement device, to decouple the temperature sensor and the heat output sensor to be distinguished from the heater of the temperature sensor, advantageously to set them apart, in particular to set them in separate openings of the cover or hollow body. The temperature sensor has a significantly higher resistance than the heater, typically one to three orders of magnitude higher.

A temperature-measuring resistor, which is optionally arranged on the heat output sensor and with which the temperature of the heat conductor can be adjusted in an especially precise way, is to be distinguished from the temperature sensor. A complete temperature-measuring resistor is not provided for the measurement of the fluid temperature, in contrast to the temperature sensor, because it is suitable only for temperature control during operation of the heat output sensor.

It has proven effective to form the carrier of the platinum thin-film resistors as thin plates, which results in extremely low thermal inertness of the system and thus high response rate of the platinum thin-film resistors. For forming a ceramic compound, sintered ceramic films can be used, which are then advantageously bonded with a glass solder. The materials used for building the flow sensor element can be used with outstanding results at temperatures in ranges from −40° C. to +800° C.

It is especially preferred if the ceramic carrier plates have a thickness in the range from 100 µm to 650 µm, preferably 150 µm to 400 µm. $Al_2O_3$ has proven effective as the material for the ceramic carrier plate, preferably amounting to at least 96 wt. % and advantageously above 99 wt. %.

For the platinum thin-film resistors, it has proven effective if these have a thickness in the range from 0.5 µm to 2 µm, preferably 0.8 µm to 1.4 µm. Heating resistors advantageously have values from 1 to 50 Ohms and trend toward lower values when the components are reduced in size. For currently common dimensions of the components, 5 to 20 Ohms are preferred. Temperature-measuring resistors advantageously have values from 50 to 10,000 Ohms and similarly trend toward lower values when the components are reduced in size. For currently common dimensions of the components, 100 to 2000 Ohms are preferred. On the temperature chip, the temperature-measuring resistor is greater by a multiple than the heating resistor. Preferably these resistor values differ by one to two orders of magnitude.

To protect the platinum thin-film resistors from corrosive attack by the measurement medium, it has proven effective if these are each covered with a passivation layer. The passivation layer advantageously has a thickness in the range from 10 µm to 30 µm, preferably 15 µm to 20 µm. A passivation layer made of at least two different individual layers, in particular individual layers made of $Al_2O_3$ and glass ceramic, has proven especially effective. The thin-film technology is suitable for creating the preferred film thickness of the $Al_2O_3$ film from 0.5 µm to 5 µm, preferably 1 µm to 3 µm.

The platinum thin-film resistors are here arranged advantageously on the end of the carrier plate facing away from the cover or hollow body, in order to guarantee the lowest possible thermal effect on the platinum thin-film resistors through the thermally inert cover or hollow body.

To prevent a mutual effect of the temperature-measuring element and heating element, it is advantageous if the platinum thin-film resistor of the heating element is arranged farther away from the cover or hollow body than the platinum thin-film resistor of the temperature-measuring element. In this way, the platinum thin-film resistors of the heating element are not arranged in the same flow thread of the measurement medium as the platinum thin-film resistors of the temperature-measuring element.

The preferred arrangement of the temperature-measuring element is in front of the heating element in the direction of flow.

Advantageously, the carrier plates of the heating element and the temperature-measuring element are set apart from each other and, preferably parallel to each other.

It has proven effective, especially for measuring media with alternating direction of flow, if two heating elements and one temperature-measuring element are arranged in series.

It has proven effective to arrange the carrier plates of the heating element and the temperature-measuring element set apart from each other in the cover or hollow body and parallel to each other.

The flow sensor element according to the invention allows a mass flow rate measurement of gaseous or liquid media in pipelines, especially when the carrier plates are arranged in the direction of flow of the medium.

Advantageously, the carrier plates of the heating element and of the temperature-measuring element are set apart from each other and, preferably arranged in series between ceramic films or parts of the ceramic component.

Here, it has proven effective if the ceramic film laminate is formed from two ceramic films or if the ceramic component is formed from two ceramic pipes, whose walls each have a half-moon profile in cross section.

It has proven effective especially for measuring media with alternating direction of flow, if one temperature-measuring element, two heating elements, and one temperature-measuring element are arranged in series.

Furthermore, arrangements have proven effective, in which the ceramic film laminate is formed from three ceramic films.

Here it has proven especially effective if the carrier plates of the heating element and of the temperature-measuring element are set apart from each other by ceramic films and arranged parallel to each other.

It is preferred to arrange a heating element between a first and a second ceramic film and a temperature-measuring element between the second and a third ceramic film of the three ceramic films, wherein the heating element and the temperature-measuring element are arranged one next to the other at the same height of the ceramic film laminate.

In addition, it has proven effective if a heating element is arranged between a first and a second ceramic film of the three ceramic films and if two temperature-measuring elements are arranged between the second and a third ceramic film of the three ceramic films, wherein the heating element is arranged between the temperature-measuring elements.

Furthermore, arrangements have proven effective, in which the ceramic film laminate is formed from four ceramic films.

Here it is preferred if a first temperature-measuring element is arranged between a first and a second ceramic film of the four ceramic films and a second temperature-measuring element is arranged between a third and a fourth ceramic film of the four ceramic films and that a heating element is arranged between the second and the third ceramic film, wherein the heating element and the temperature-measuring elements are arranged one next to the other at the same height of the ceramic film laminate.

Furthermore, it is preferred if a first temperature-measuring element is arranged between a first and a second ceramic film of the four ceramic films and a second temperature-measuring element is arranged between a third and a fourth ceramic film of the four ceramic films and if a heating element is arranged between the second and the third ceramic films, wherein the temperature-measuring elements are arranged one next to the other at the same height of the ceramic film laminate and the heating element is arranged offset relative to the temperature-measuring elements.

The use of a flow sensor element according to the invention for measuring the mass flow rate of gaseous or liquid media through pipelines is ideal, wherein the carrier plates are arranged parallel to the direction of flow of the medium.

Here, the flow sensor element according to the invention is suitable, in particular for measuring gaseous media with a temperature in the range from 40° C. to +800° C., which the exhaust gas of an internal combustion engine can have, for example.

Self-cleaning by heating the temperature-measuring element is suitable especially for sensors arranged in the exhaust-gas region of internal combustion engines, in particular diesel engines. Carbon particulate-coated sensors are made fully functional again quickly through heating, in particular calcination. Here, this self-cleaning can be repeated an arbitrary number of times during the service life of an engine.

The arrangement of several temperature-measuring elements and heating elements on the carrier element ideally also allows the detection of the direction of flow or of changes in the direction of flow of a medium. In this respect, it is advantageous to use the flow sensor element according to the invention for measuring media with a direction of flow that changes at time intervals.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 5 is a schematic top view of a flow sensor element having a three-layer ceramic film laminate, a temperature-measuring element, and a heating element.

FIG. 5a is a schematic perspective view of the flow sensor element from FIG. 5.

FIG. 6b is a schematic side view of the flow sensor element from FIG. 6a.

FIG. 9 is a schematic sectional view of a flow sensor element having a multiple-part ceramic component, a temperature-measuring element, and a heating element in cross section A-A' of FIG. 9a.

FIG. 9a is a schematic side view of the flow sensor element from FIG. 9.

DETAILED DESCRIPTION OF THE INVENTION

FIGS. 1 to 13 illustrate embodiments of the flow sensor element according to the invention merely by way of example. Here it should be explicitly added that the arrangement of electrically conductive tracks and connection surfaces and also the number of platinum thin films per temperature-measuring element or heating element can also be selected differently, without leaving the scope of the invention.

Figure 1:
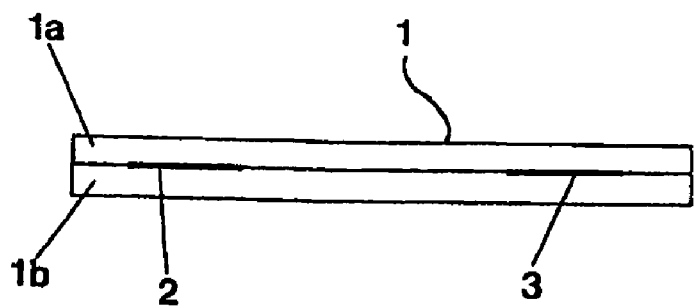
FIG. 1 is a schematic top view of the flow sensor element of FIG. 1a having a two-layer ceramic film laminate and a temperature-measuring element and a heating element.

FIG. 1 shows a flow sensor element having a ceramic film laminate 1, which is formed from a first ceramic film 1a made of $Al_2O_3$ and a second ceramic film 1b made of $Al_2O_3$. A temperature-measuring element 2 and a heating element 3 are partially embedded and electrically contacted between the first ceramic film 1a and the second ceramic film 1b.

This enables a measurement of the mass flow rate according to the principle of the hot-film anemometer. The heating element 3 is here held either to a constant temperature (e.g., of 450° C.) or a constant temperature difference (e.g., of 100° K) relative to the temperature-measuring element 2 by an electrical control circuit (bridge circuit and amplifier in a control loop). A change in mass flow for the medium now causes a change in the power consumption of the heating element 3, which can be evaluated electronically and is directly proportional to the mass flow.

Figure 1A:
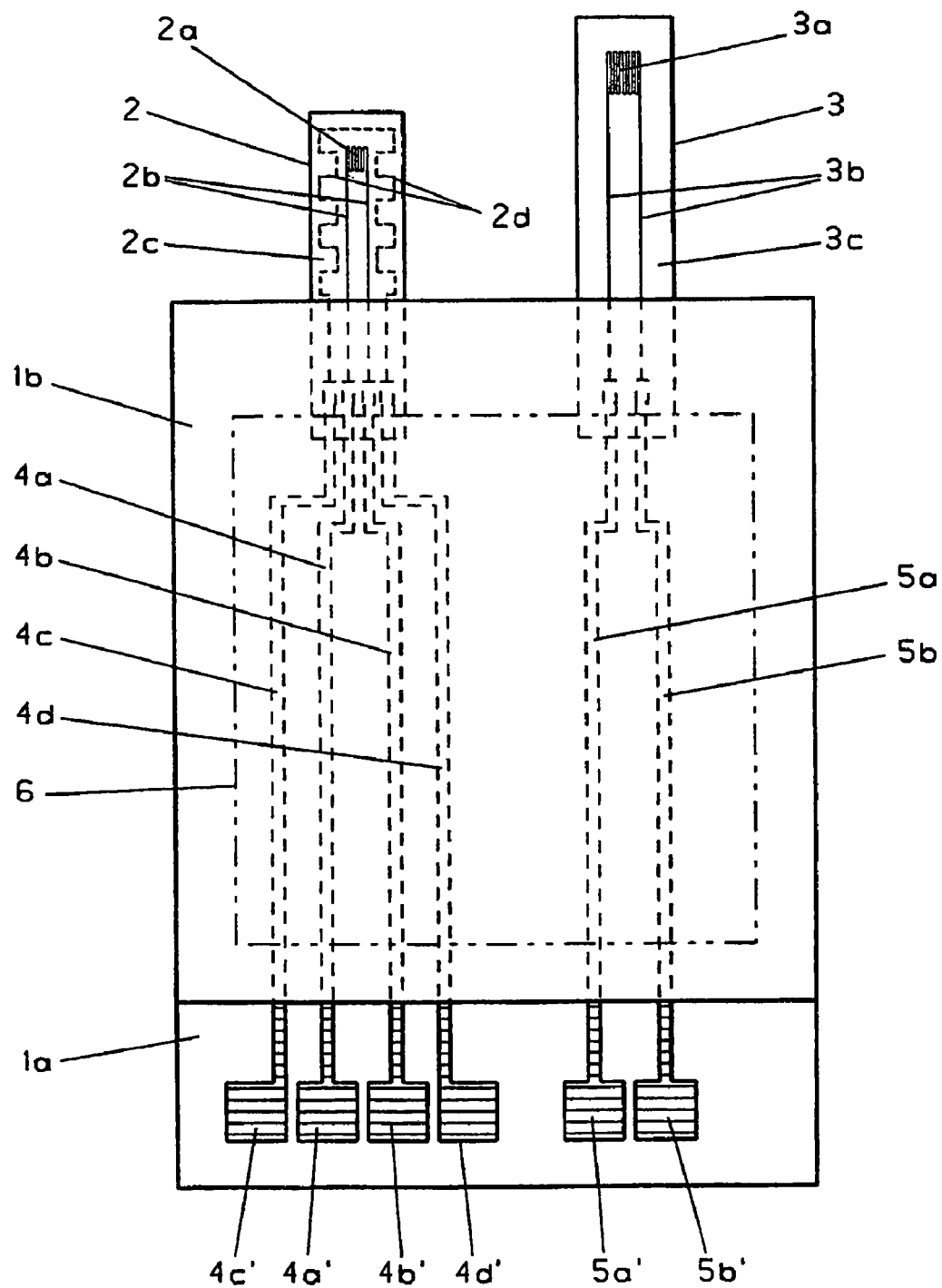
FIG. 1a is a schematic side view of the flow sensor element from FIG. 1.

FIG. 1a shows the flow sensor element from FIG. 1 in a side view. Here it can be seen that the temperature-measuring element 2 and the heating element 3 are contacted electrically by electrically conductive tracks 4a, 4b, 4c, 4d, 5a, 5b to connection surfaces 4a', 4b', 4c', 4d', 5a', 5b'. The electrically conductive tracks 4a, 4b, 4c, 4d, 5a, 5b are arranged on the first ceramic film 1a and covered partially by the second ceramic film 1b. Therefore, its position is indicated partially with dashed lines. The temperature-measuring element 2 has a carrier plate 2c made of an individual film made of $Al_2O_3$. A platinum thin-film element 2a for measuring temperature and 2d for heating and electrical connection lines 2b are arranged on the reverse side of the carrier plate 2c including an electrically insulating coating and their position is therefore shown with dashed lines. The heating element 3 has a carrier plate 3c made of an individual film made of $Al_2O_3$. A platinum thin-film element 3a as a heater and its electrical connection lines 3b are arranged on the reverse side of the carrier film 3c and their position is therefore shown with dashed lines.

The ceramic films 1a, 1b are connected in region 6 either directly to each other by sintering or by glass solder. The connection surfaces 4a', 4b', 4c', 4d', 5a', 5b' are uncovered from the second ceramic film 1b, so that a connection can be realized with electrical cables not shown here.

Figure 2:
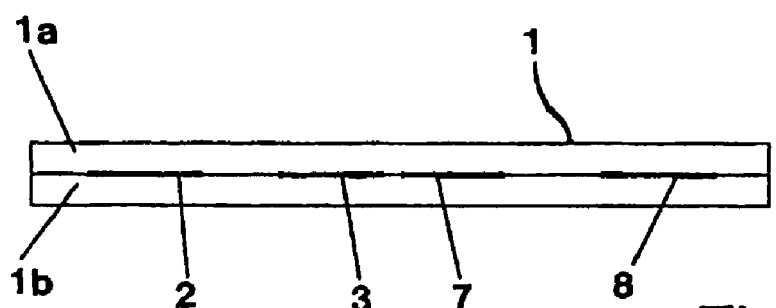
FIG. 2 is a schematic top view of the flow sensor element of FIG. 2a having a two-layer ceramic film laminate and two temperature-measuring elements and two heating elements.

FIG. 2 shows a flow sensor element having a ceramic film laminate 1, which is formed from a first ceramic film 1a made of $Al_2O_3$ and a second ceramic film 1b made of $Al_2O_3$. Two temperature-measuring elements 2, 8 and two heating elements 3, 7 are partially embedded and electrically contacted in series between the first ceramic film 1a and the second ceramic film 1b.

This allows, in turn, a measurement according to the principle of the hot-film anemometer, as already described for FIG. 1. However, the number of heating elements 3, 7 and temperature-measuring elements 2, 8 now allow an electrical control loop to be formed and evaluated for each heating element and each temperature-measuring element (2 and 3 or 7 and 8). With this flow sensor element, it is now possible to detect the direction of flow of a medium, because thermal energy is transferred from the heating element, which is arranged first in the direction of flow, to the next heating element. The change in temperature or heating of the subsequent heating element leads to lower power consumption of this heating element, which can be evaluated as a signal for the direction of flow of the medium.

Figure 2A:
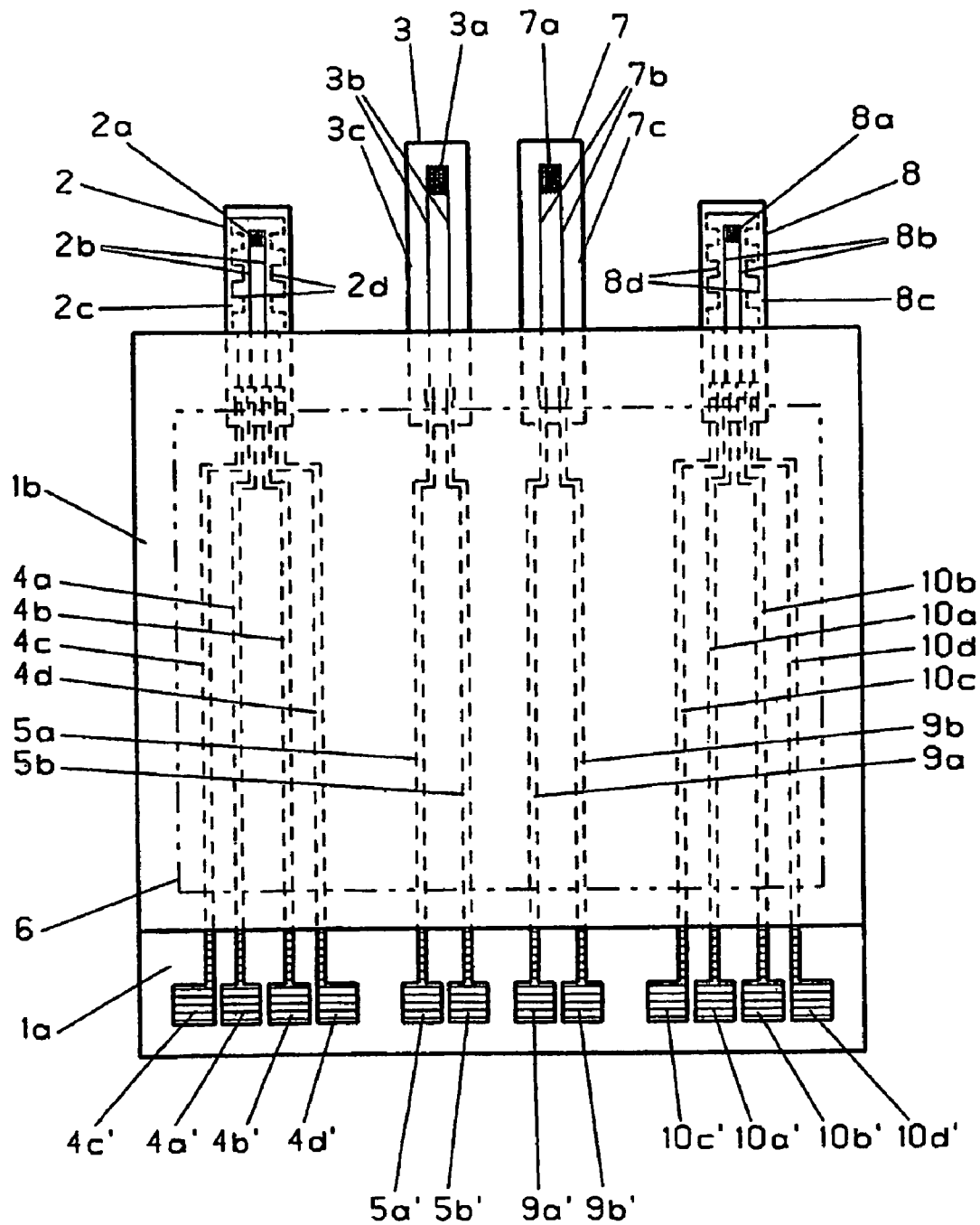
FIG. 2a is a schematic side view of the flow sensor element from FIG. 2.

FIG. 2a shows the flow sensor element from FIG. 2 in a side view. Here it can be seen that the temperature-measuring elements 2, 8 and the heating elements 3, 7 are electrically contacted by electrically conductive tracks 4a, 4b, 4c, 4d, 5a, 5b, 9a, 9b, 10a, 10b, 10c, 10d to connection surfaces 4a', 4b', 4c', 4d', 5a', 5b', 9a', 9b', 10a', 10b', 10c', 10d'. The electrically conductive tracks 4a, 4b, 4c, 4d, 5a, 5b, 9a, 9b, 10a, 10b, 10c, 10d are arranged on the first ceramic film 1a and partially covered by the second ceramic film 1b. Therefore, its position is shown partially with dashed lines. The temperature-measuring element 2 has a carrier plate 2c made of two individual films made of $Al_2O_3$ and $SiO_2$. A platinum thin-film element 2a for measuring temperature and 2d for calcination and its electrical connection lines 2b are arranged on the reverse side of the carrier plate 2c and their position are therefore shown with dashed lines. The heating element 3 has a carrier plate 3c made of two individual films made of $Al_2O_3$ and $SiO_2$. A platinum thin-film element 3a as a heater and its electrical connection lines are arranged on the reverse side of the carrier plate 3c and their position is therefore shown with dashed lines. The heating element 7 has a carrier plate 7c made of two individual films made of $Al_2O_3$ and $SiO_2$. A platinum thin-film element 7a as a heater and its electrical connection lines 7b are arranged on the reverse side of the carrier plate 7c and their position is therefore shown with dashed lines. The temperature-measuring element 8 has a carrier plate 8c made of two individual films made of $Al_2O_3$ and $SiO_2$. A platinum thin-film element 8d for measuring temperature and 2a for calcination and its electrical connection lines 8b are arranged on the reverse side of the carrier plate 8c and their position is therefore shown with dashed lines.

The ceramic films 1a, 1b are connected either directly to each other through sintering or by a glass solder. The connection surfaces 4a', 4b', 4c', 4d', 5a', 5b', 9a', 9b', 10a', 10b' 10c', 10d' are uncovered from the second ceramic film 1b, so that a connection to electrical cables not shown here can be realized.

Figure 3:
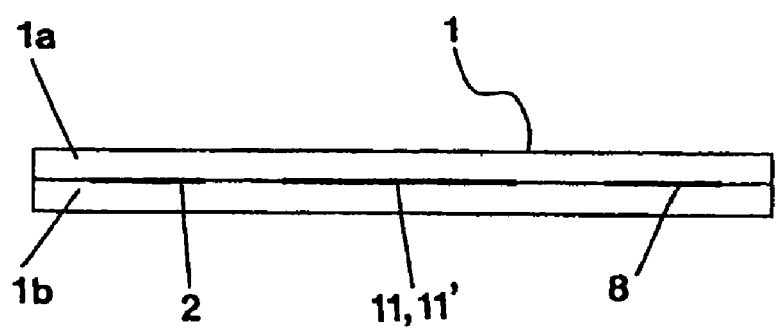
FIG. 3 is a schematic top view of the flow sensor element of FIG. 3a having a two-layer ceramic film laminate and two temperature-measuring elements and one double heating element.

FIG. 3 shows a flow sensor element having a ceramic film laminate 1, which is formed from a first ceramic film 1a made of $Al_2O_3$ and a second ceramic film 1b made of $Al_2O_3$. Two temperature-measuring elements 2, 8 and a double heating element 11, 11' are partially embedded and electrically contacted between the first ceramic film 1a and the second ceramic film 1b. Here, a double heating element is understood in such a way that two heating elements, which can be electrically controlled separately, are constructed on a common carrier plate. With this flow sensor element, it is also possible to detect the direction of flow of a medium.

Figure 3A:
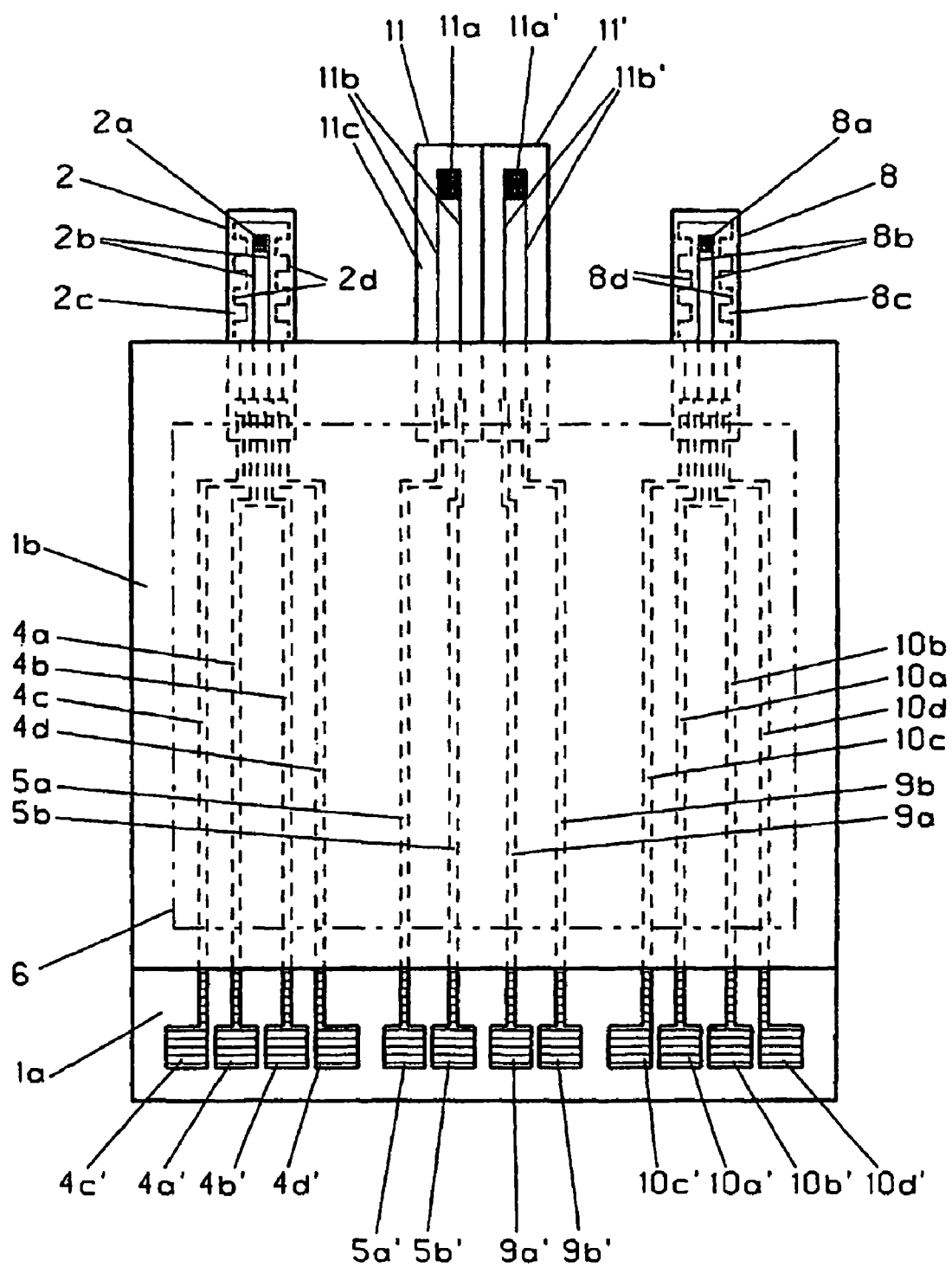
FIG. 3a is a schematic side view of the flow sensor element from FIG. 3.

FIG. 3a shows the flow sensor element from FIG. 3 in a side view. Here it can be seen that the temperature-measuring elements 2, 8 and the double heating element 11, 11' are contacted electrically by electrically conductive tracks 4a, 4b, 4c, 4d, 5a, 5b, 9a, 9b, 10a, 10b 10c, 10d to connection surfaces 4a', 4b', 4c', 4d', 5a', 5b', 9a', 9b', 10a', 10b' 10c', 10d'. The electrically conductive tracks 4a, 4b, 4c, 4d, 5a, 5b, 9a, 9b, 10a, 10b 10c, 10d are arranged on the first ceramic film 1a and partially covered by the second ceramic film 1b. Its position is therefore indicated partially with dashed lines. The temperature-measuring element 2 has a carrier plate 2c made of an individual film made of $Al_2O_3$. A platinum thin-film element 2a for measuring temperature and 2d for heating and its electrical connection lines 2b are arranged on the reverse side of the carrier plate 2c including the electrically insulating coating and their position is therefore shown with dashed lines. The double heating element 11, 11' has a carrier plate 11c made of two individual films made of $Al_2O_3$ and $SiO_2$. Platinum thin-film elements 11a, 11a' as heaters and their electrical connection lines 1b, 1b' are arranged on the reverse side of the carrier plate 11c including electrically insulating coating and their position is therefore shown with dashed lines. The temperature-measuring element 8 has a carrier plate 8c made of two individual films made of $Al_2O_3$ and $SiO_2$. A platinum thin-film element 8d for measuring temperature and 8a for heating and its electrical connection lines 8b are arranged on the reverse side of the carrier plate 8c and their position is therefore shown with dashed lines.

The ceramic films 1a, 1b are either sintered directly to each other in region 6 or are connected by glass solder. The connection surfaces 4a', 4b', 4c', 4d', 5a', 5b', 9a', 9b', 10a', 10b' 10c', 10d' are uncovered from the second ceramic film 1b, so that a connection with electrical cables not shown here can be realized.

Figure 4:
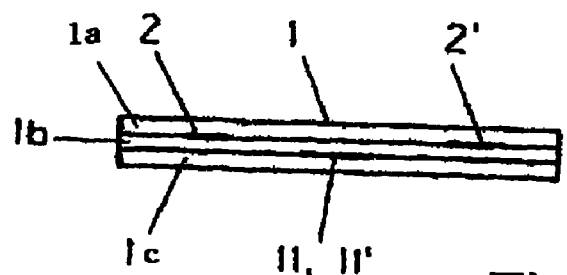
FIG. 4 is a schematic top view of a flow sensor element having a three-layer ceramic film laminate, two temperature-measuring elements, and one double heating element.

FIG. 4 shows a flow sensor element having a ceramic film laminate 1, which is formed from a first ceramic film 1a, a second ceramic film 1b, and a third ceramic film 1c made of $Al_2O_3$. Two temperature-measuring elements 2, 2' are partially embedded and electrically contacted between the first ceramic film 1a and the second ceramic film 1b. A double heating element 11, 11' is partially embedded and electrically contacted between the second ceramic film 1b and the third ceramic film 1c.

Figure 6:
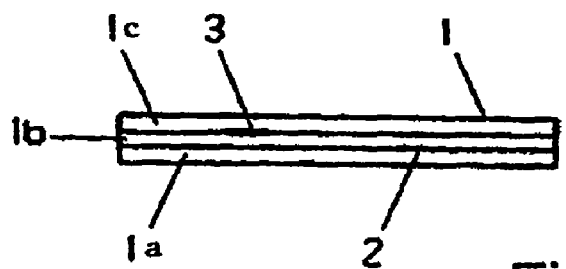
FIG. 6 is a schematic top view of a flow sensor element having a three-layer ceramic film laminate, a temperature-measuring element, and a heating element.

FIGS. 5, 5a and FIG. 6 each show a flow sensor element having a ceramic film laminate 1, which is formed from a first ceramic film 1a, a second ceramic film 1b, and a third ceramic film 1c made of $Al_2O_3$. A temperature-measuring element 2 is partially embedded and electrically contacted between the first ceramic film 1a and the second ceramic film 1b. A heating element 3 is partially embedded and electrically contacted between the second ceramic film 1b and the third ceramic film 1c. With these flow sensor elements, it is not possible to detect the direction of flow of the medium.

Figure 6B:
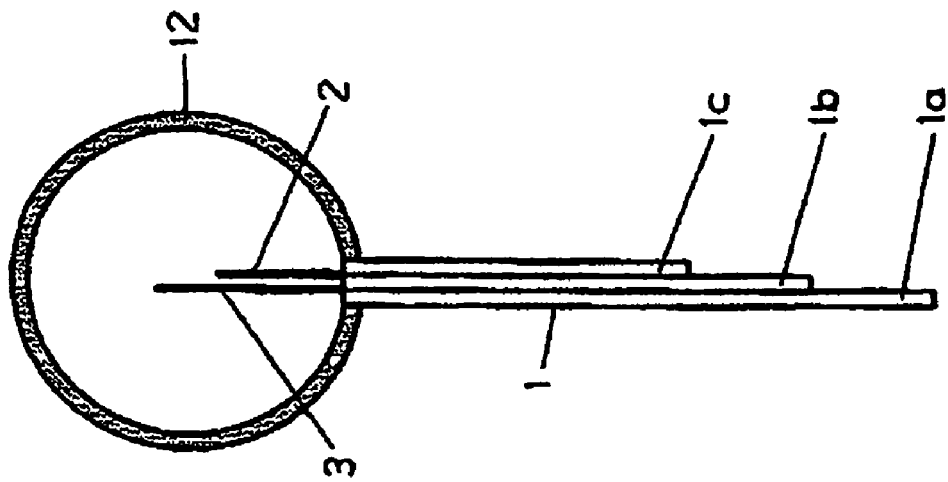
Figure 6A:
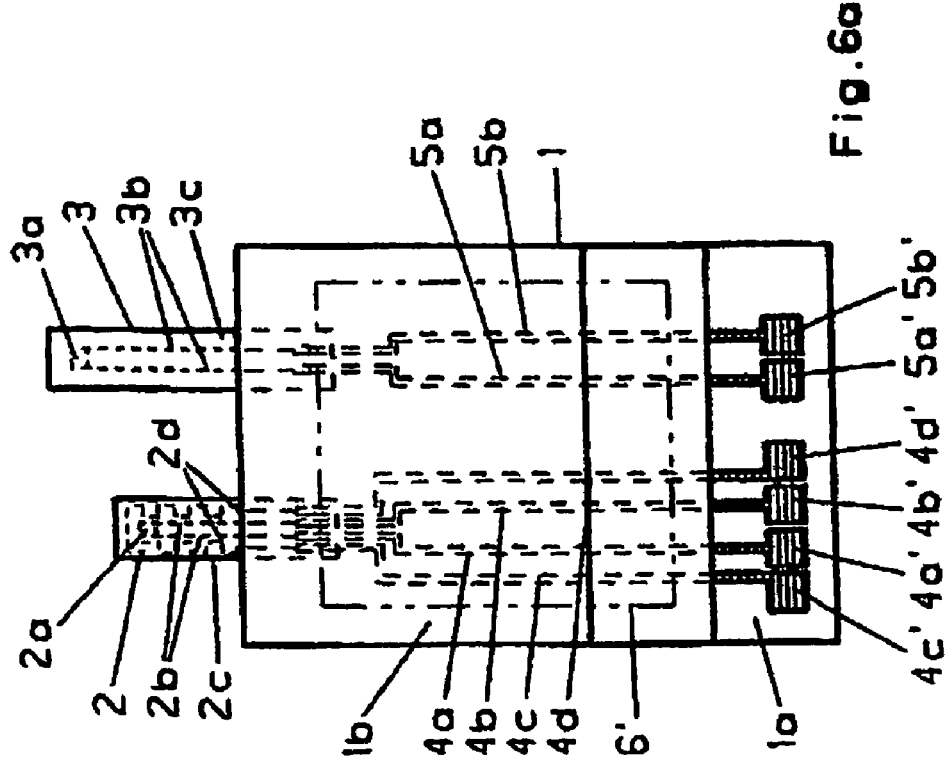
FIG. 6a is a schematic side view of the flow sensor element from FIG. 6.

FIG. 6a shows the flow sensor element from FIG. 6 in a side view. Here it can be seen that the temperature-measuring element 2 and the heating element 3 are electrically contacted by electrically conductive tracks 4a, 4b, 4c, 4d, 5a, 5b to connection surfaces 4a', 4b', 4c', 4d', 5a', 5b'. The electrically conductive tracks 5a, 5b are arranged on the first ceramic film 1a and partially covered by the second ceramic film 1b. Its position is therefore shown partially with dashed lines. The electrically conductive tracks 4a, 4b, 4c, 4d are arranged on the second ceramic film 1b and partially covered by the third ceramic film 1c. Its position is therefore shown partially with dashed lines. The temperature-measuring element 2 has a carrier film 2c made of an individual layer made of $Al_2O_3$. A platinum thin-film element 2a for measuring temperature and its electrical connection lines 2b are arranged on the reverse side of the carrier plate 2c including electrically insulating coating and their position is therefore shown with dashed lines. In a preferred construction, the carrier plate is equipped with an additional thin-film element 2d for heating the temperature element, which is electrically contacted analogously. The heating element 3 has a carrier plate 3c made of an individual layer made of $Al_2O_3$. A platinum thin-film element 3a as a heater and its electrical connection lines 3b are arranged on the reverse side of the carrier plate 3c and their position is therefore shown with dashed lines. The ceramic films 1a, 1b are connected in region 6' either directly to each other through sintering or by a glass solder. The connection surfaces 5a', 5b' are uncovered from the second ceramic film 1b, so that a connection with the electrical cables not shown here can be realized. The ceramic films 1b, 1c are connected in region 6 either directly to each other through sintering or by a glass solder. The connection surfaces 4a', 4b', 4c', 4d' are uncovered by the third ceramic film 1c, so that a connection to electrical cables not shown here can be realized.

FIG. 6b shows the flow sensor element from FIG. 6a in a side view, wherein this is installed in the cross section of a pipeline 12. The carrier films 2c, 3c of the temperature-measuring element 2 and the heating element 3 are here inserted into the pipeline parallel to the direction of flow.

Figure 7:
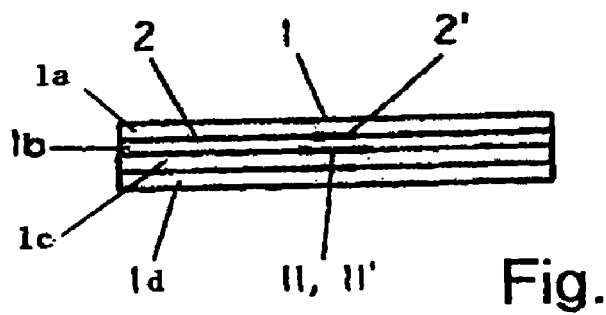
FIG. 7 is a schematic top view of a flow sensor element having a four-layer ceramic film laminate, two temperature-measuring elements, and a double heating element.
Figure 8:
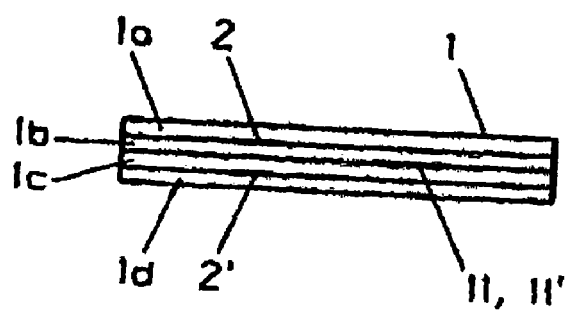
FIG. 8 is a schematic top view of a flow sensor element having a four-layer ceramic film laminate, two temperature-measuring elements, and one double heating element.

FIG. 7 and FIG. 8 each show a flow sensor element having a ceramic film laminate 1, which is formed from a first ceramic film 1a, a second ceramic film 1b, a third ceramic film 1c, and a fourth ceramic film 1d made of $Al_2O_3$. A temperature-measuring element 2 is partially embedded and electrically contacted between the first ceramic film 1a and the second ceramic film 1b. A double heating element 11, 11' is partially embedded and electrically contacted between the second ceramic film 1b and the third ceramic film 1c. Another temperature-measuring element 2' is partially embedded and electrically contacted between the third ceramic film 1c and the fourth ceramic film 1d (FIG. 8) or between films 1a and 1b (FIG. 7).

FIG. 9 shows a flow sensor element in cross section 9-9 of FIG. 9a, having a multiple-part ceramic component 13a, 13b, 14a, 14b made of $Al_2O_3$, which has a temperature-measuring element 2 and a heating element 3. The ceramic component 13a, 13b, 14a, 14b has two hollow spaces 15a, 15b, which are closed gas-tight in the region of the temperature-measuring element 2 or the heating element 3. For installation in a pipeline, there is a connection flange 16.

FIG. 9a shows the flow sensor element from FIG. 9 in a side view. Here, the temperature-measuring element 2 and the heating element 3 are electrically contacted by electrically conductive tracks 4a, 4b, 5a, 5b that can be seen here only partially to connection surfaces 4a', 4b', 4c', 4d', 5a', 5b'. The electrically conductive tracks 4a, 4b, 4c, 4d, 5a, 5b are arranged on a ceramic plate 14a and partially covered—not visible in this diagram—by a second ceramic plate 14b. The temperature-measuring element 2 has a carrier plate 2c made of an individual film made of $Al_2O_3$. A platinum thin-film element 2a for measuring temperature and its electrical connection lines 2b are arranged on the reverse side of the carrier film 2c and their position is therefore shown with dashed lines. In a preferred construction, the carrier plate 2c has an additional platinum thin-film element 2d with a resistance value that is smaller by an order of magnitude. This resistor designed for heating or calcination is electrically contacted to an additional contact analogous to the thin-film element 2a. The heating element 3 has a carrier plate 3c made of an individual layer made of $Al_2O_3$. A platinum thin-film element 3a as a heater and its electrical connection lines 3b are arranged on the reverse side of the carrier plate 3c and their position is therefore shown with dashed lines.

The ceramic plates 14a, 14b are connected either directly to each other by sintering or by a glass solder and connected to pipe shells 13a, 13b to form the ceramic component. However, it is also possible to use two half pipes (13a plus 14a; 13b plus 14b), in which the ceramic plate 14a and the pipe shell 13a and the ceramic plate 14b and the pipe shell 14b, respectively, are each combined to form a single-piece component. The connection surfaces 4a', 4b', 4c', 4d', 5a', 5b' are uncovered by the second ceramic plate 14b, so that a connection with electrical cables not shown here can be realized.

Figure 10A:
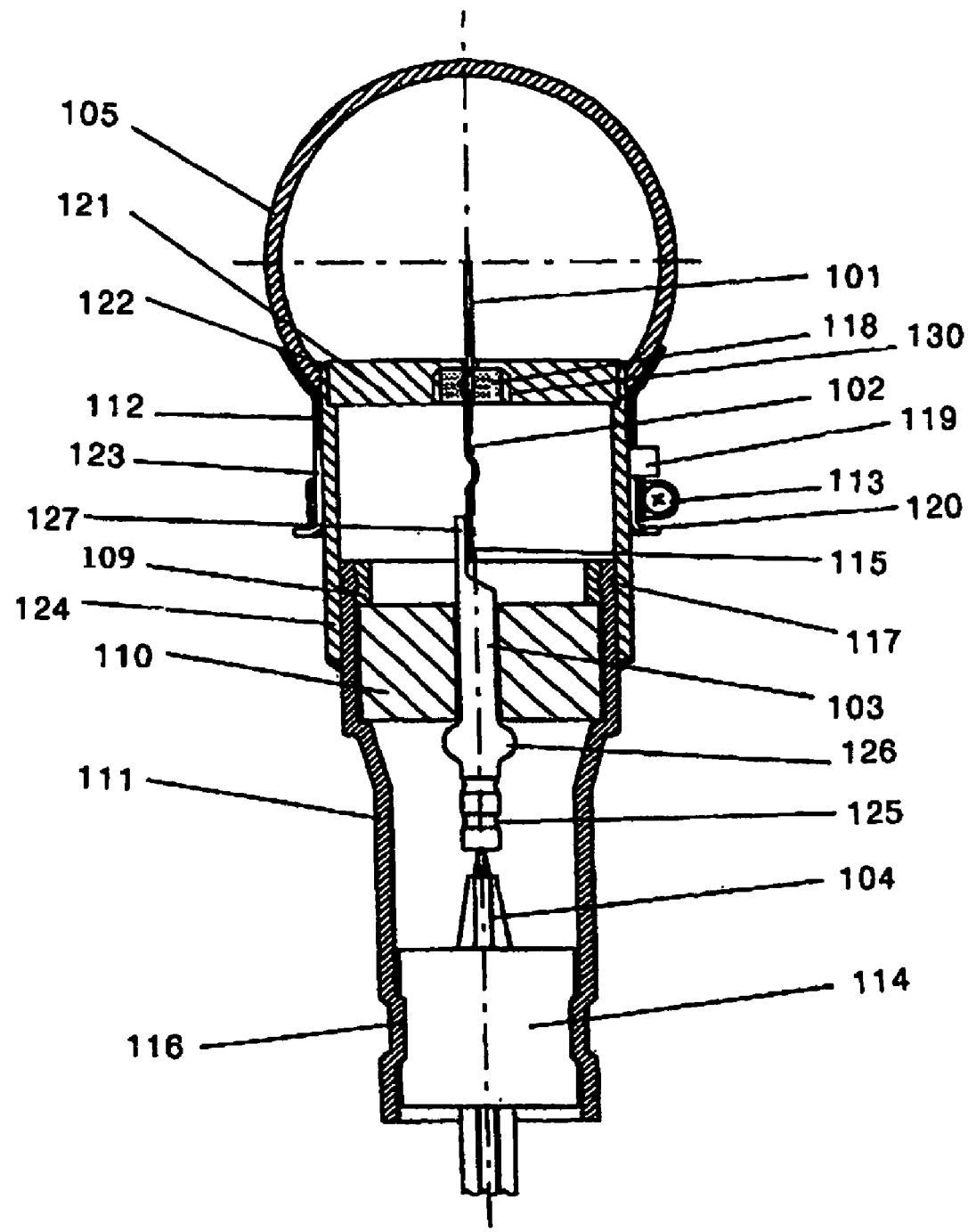
FIG. 10a is a schematic sectional view of a flow sensor element having a heating element and temperature-measuring element arranged in a metal disk.

According to FIG. 10a, a sensor element is produced having sealing compound or glass 118 in a carrier disk 121 made of heat-resistant and exhaust-gas resistant stainless steel. Through a structured inner wall of the sealing compound space, e.g., by a thread 130, a good bonding of the sealing compound is achieved. The region of the carrier disk 121, through which the sensor element projects toward the medium, has rectangular contours, which are only slightly greater than the sensor element cross section. In this way, the flow sensor element is held oriented in the media-guiding pipe 105 and the interior of the complete sensor is sealed against the medium.

The carrier disk 121 is inserted into a housing 124 and welded tight with a round seam 122. The housing 111 is welded in the housing tube 124. The insulating body 110 made of temperature-resistant plastic or ceramic is held in the housing 111 with a ring 109, which is fixed by a bead 117. On the cable outlet, with the bead 116 a cable feed-through bushing 114 made of elastomer is fixed tightly. Supply lines 104 are guided through the boreholes of a feed-through bushing 114. Each supply line is connected electrically to a contact sleeve 103 by a crimp 125. The contact sleeve 103 has, below an insulating part 110, a widened part 126 and, above the insulating part 110, a surface 127, which is wider than the contact sleeve diameter, so that the contact sleeve is fixed in the insulating part 110 in the contact sleeve. On the surface 127, the connection wires 102 are electrically contacted to the weld 115.

The attachment of the complete sensor to the media-guiding pipe 105 is realized by a commercially available worm thread hose shell 113 and a slotted sheet-metal flange part 112 welded onto the media-guiding pipe 105. The alignment of the flow sensor element 101 in the pipe 105 is realized by a centering pin 119, which is fixed on the housing pipe 124 and in the sheet-metal flange part 112 above the wide slot 120. Opposite a wide slot 120 there is a narrow slot 123, which is used only to be able to press the sheet-metal flange part 112 more easily against the housing pipe 124. This permits assembly only at the correct angular position.

Figure 10B:
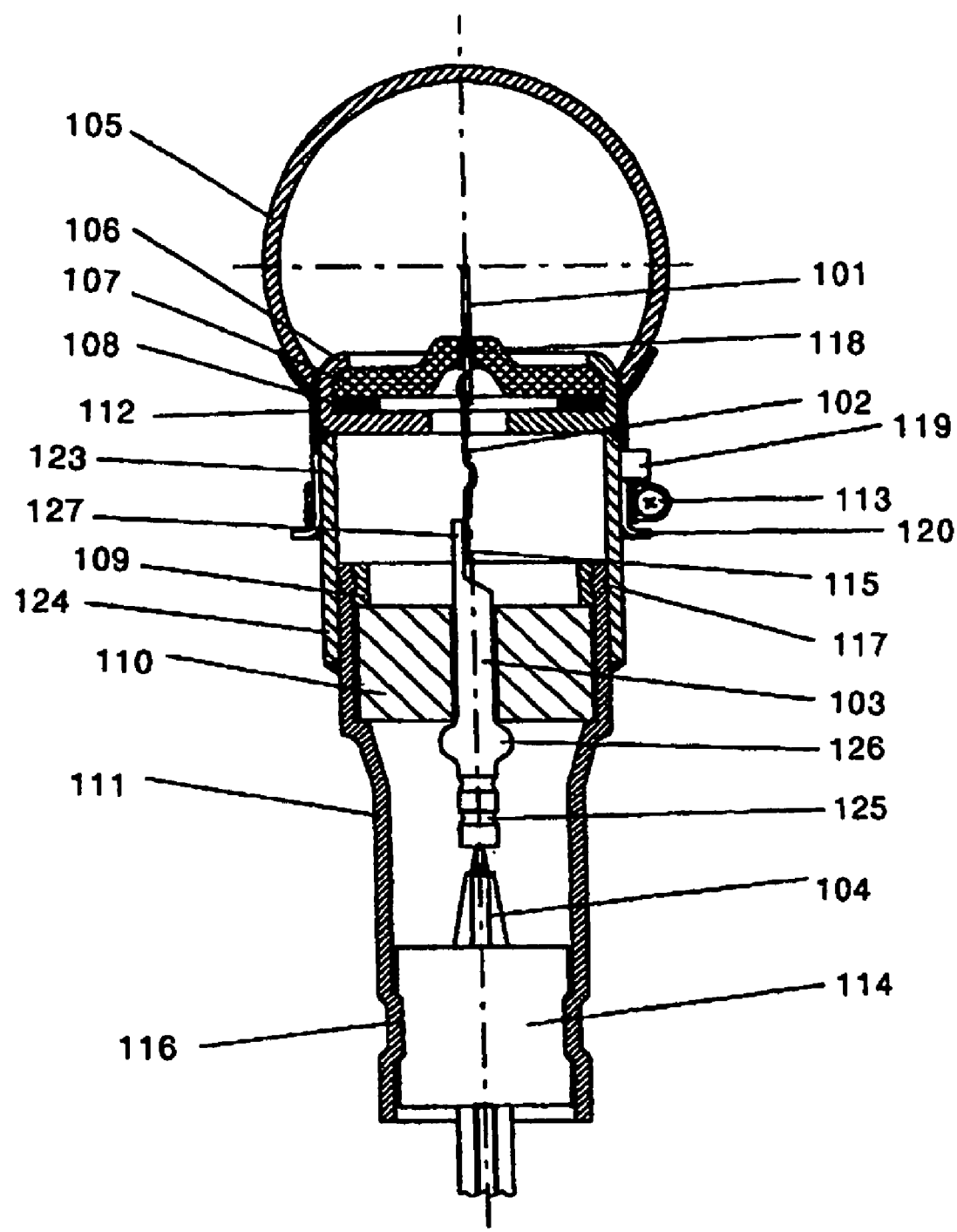
FIG. 10b is a schematic sectional view of a flow sensor element having a heating element and temperature-measuring element arranged in a ceramic disk.
Figure 11A:
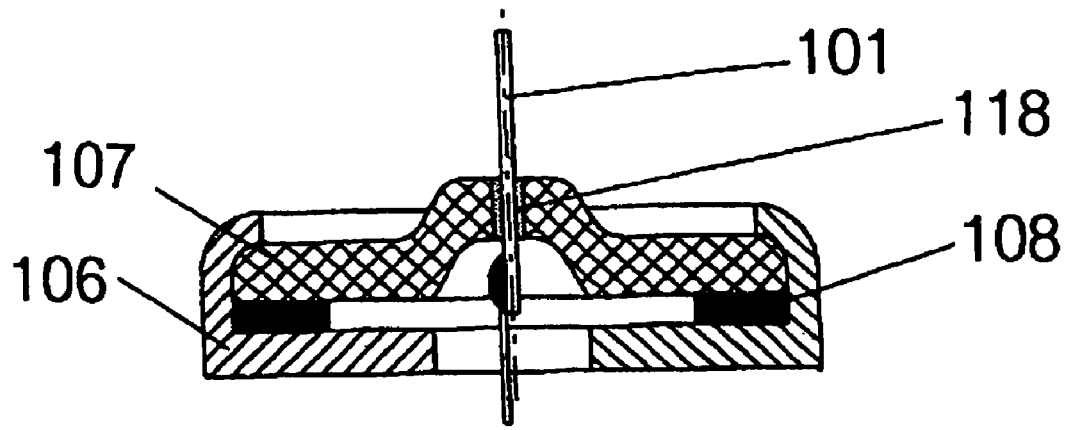
FIG. 11a is a schematic sectional view of a detail according to FIG. 10b concerning an arrangement of film resistors in a ceramic disk.

FIGS. 10b and 11a show another construction having a ceramic carrier disk 107, in which the flow element 101 is fixed with glass solder 118 in the carrier disk 107. The carrier disk 107 is crimped together with a high temperature-resistant seal 108 made of mica or graphite in the metallic holder 106. The holder 106 is similarly welded tight to the housing pipe 124.

Figure 11B:
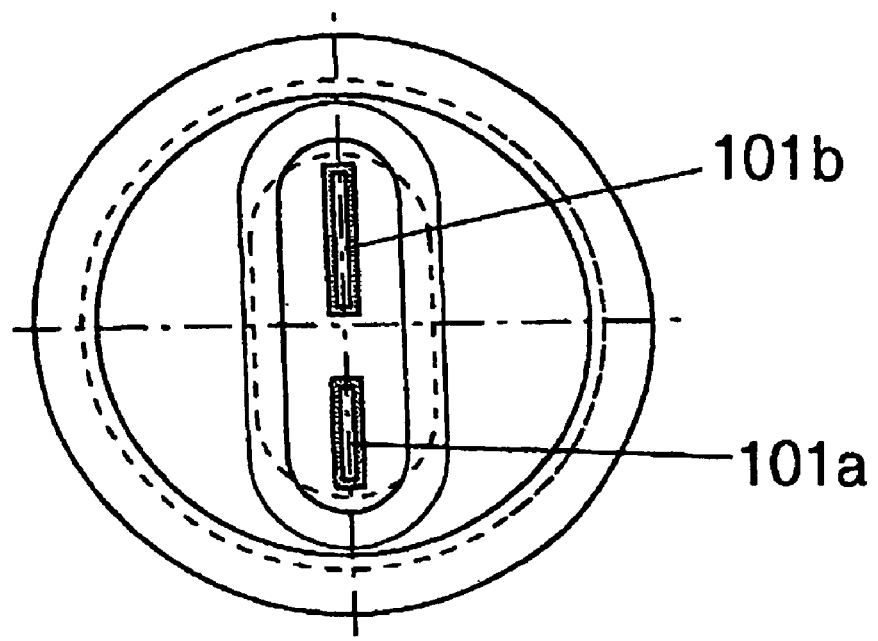
FIG. 11b is a schematic top view of a detail similar to FIG. 11a of another arrangement of film resistors in a ceramic disk.

In one construction as a measurement device of a flow sensor according to the hot film anemometer principle, similar to FIGS. 10b and 11a and shown in top view in FIG. 11b, the heating element is formed as a heat output sensor 101a and the temperature-measuring element is formed as a temperature sensor 101b, which can also carry a heat conductor for the calcination.

Figure 12:
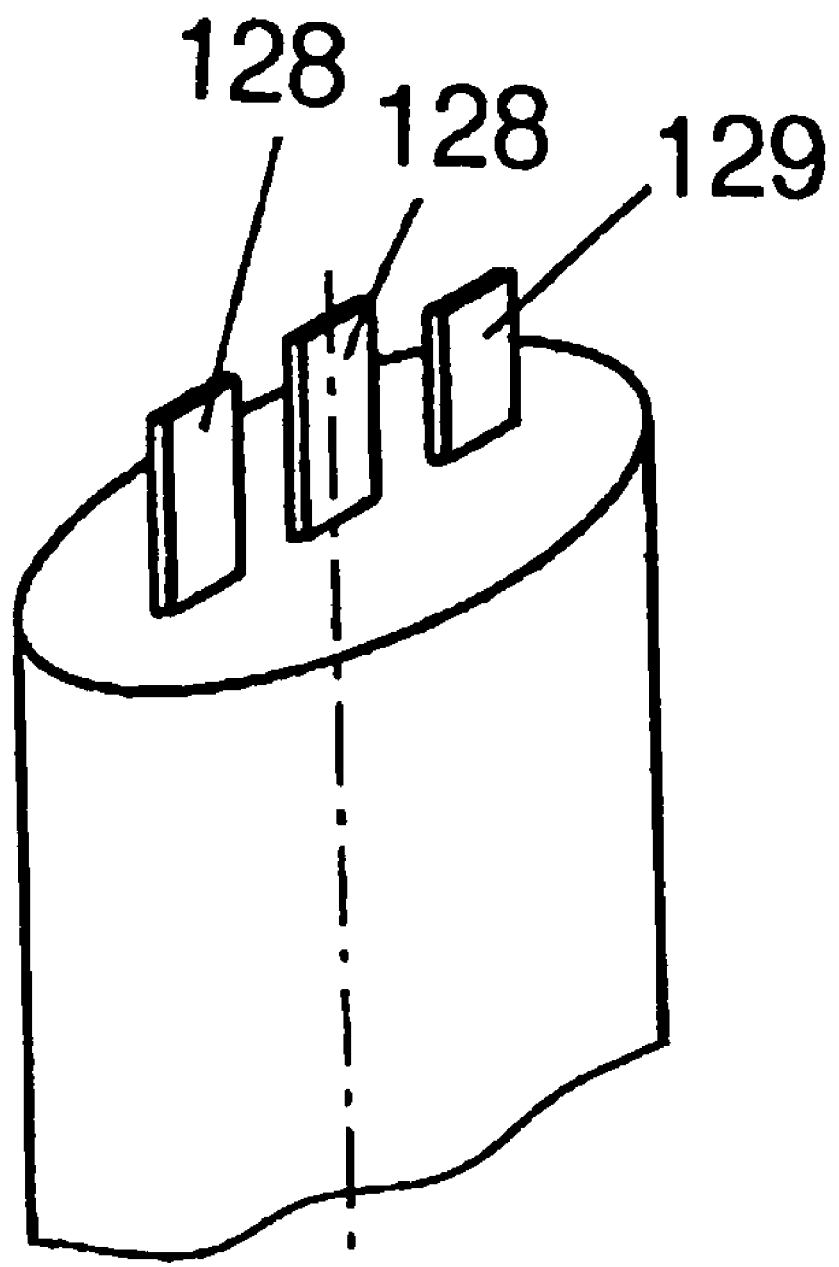
FIG. 12 is a schematic perspective view of a portion of an anemometric flow sensor element with detection of flow direction.

According to FIG. 12 there are two heat output sensors 128 for detecting the direction of media flow. The anemometric measurement principle basically functions in such a way that the temperature-measuring element detects the media temperature precisely. The one or two heating elements of the heat output sensors 128 are then held to a constant over-temperature relative to the temperature sensor 129 by an electrical circuit. The gas or liquid flow to be measured cools the heating element or elements of the heat output sensors to a greater or lesser degree.

For maintaining the constant over-temperature, for a mass flow, the electronics must also deliver a corresponding flow to the heating element/elements; this generates a voltage, which is correlated and can be evaluated with the mass flow, on a precise measurement resistor. The double arrangement of the heat output sensor 128 here allows the detection of the mass flow direction.

Figure 13:
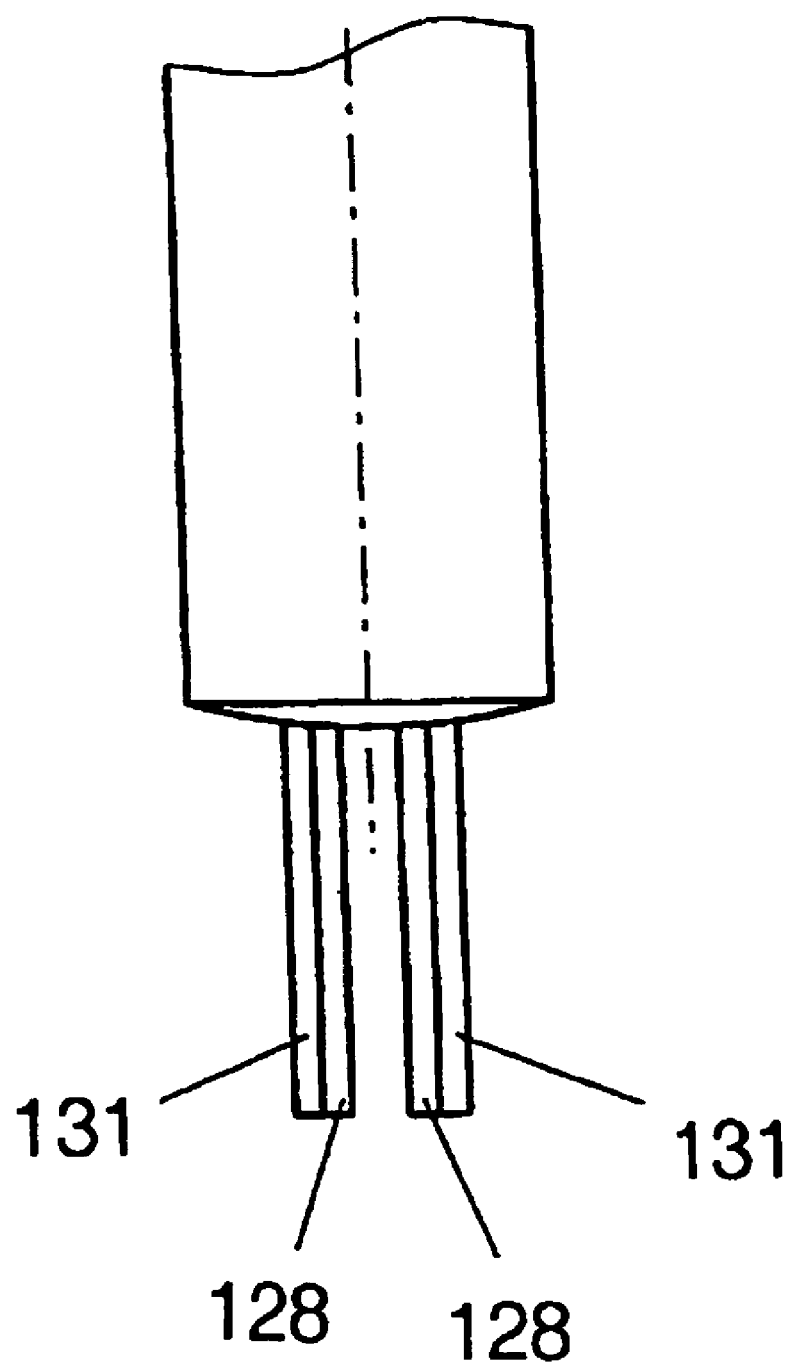
FIG. 13 is a schematic side view of a flow sensor element having two thermally decoupled heaters.

In contrast, in a construction as a carbon-particulate sensor according to FIG. 13 two heat output sensors are placed parallel and opposite each other in a pipe housing. Here, the two heat output sensors 128 are each still provided with a glazed ceramic plate 131.

In the specified arrangement, a heat output sensor is operated above the pyrolytic incineration temperature; i.e., at about 500° C. The second heat output sensor is here operated in a lower temperature range from 200-450° C., preferably from 300-400° C. If there is carbon particulate deposited on this second heat output sensor, this deposited film acts as thermal insulation and changes the IR emission properties in the sense of a larger black body. This can be evaluated electronically in a reference measurement for the first heat output sensor.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for self-cleaning of a flow sensor element, the sensor element comprising a temperature-measuring element and a heating element arranged on a carrier element, the method comprising providing the temperature-measuring element with a platinum thin-film resistor on a ceramic substrate for measuring temperature and heating the temperature-measuring element with an additional platinum thin-film resistor.

2. A method for self-cleaning of a flow sensor element, the method comprising fixing a temperature-measuring element and a heating element in an opening of a cover or a hollow body surface, providing the temperature-measuring element with a platinum thin-film resistor on a ceramic substrate for measuring temperature, and heating the temperature-measuring element with an additional platinum thin-film resistor.

3. A flow sensor element comprising a temperature-measuring element and a heating element arranged set apart from each other on a carrier element, wherein the temperature-measuring element comprises two platinum thin-film resistors on a ceramic substrate, and one of the two resistors has a resistance value that is a multiple of a resistance value of the other of the two resistors.

4. A Flow sensor element comprising a temperature-measuring element and a heating element fixed set apart from each other in an opening of a cover or a hollow body surface, wherein the temperature-measuring element comprises two platinum thin-film resistors on a ceramic substrate, and one of the two resistors has a resistance value that is a multiple of a resistance value of the other of the two resistors.

5. The flow sensor element according to claim 3, wherein the carrier element, the temperature-measuring element, and heating element together form a component of multiple ceramic parts.

6. The flow sensor element according to claim 3, wherein the two resistors of the temperature-measuring element lie in one plane.

7. The flow sensor element according to claim 3, wherein a smaller of the two resistors functions as a heater and frames a larger of the two resistors which functions for temperature measurement.

8. A method for producing a flow sensor element according to claim 3, the method comprising laminating ceramic films to form the carrier element.

9. A method for producing an anemometric measurement device of a flow sensor, the anemometric measurement device comprising at least two film resistors and a cover or a hollow body, the method comprising providing at least two film resistors having resistance values differing by one to two orders of magnitude, placing the at least two film resistors in separate openings of the cover or the hollow body, and fixing the resistors in the respective openings.

10. A method for measuring a mass flow rate of a gaseous or fluid medium through a pipeline, the method comprising providing a flow sensor element according to claim 3 with carrier films, and arranging the carrier films parallel to a flow direction of the medium.

11. A measurement device of a flow sensor, comprising film resistors each including a carrier element having an electrically insulating surface and a structured resistive film films arranged on the surface in at least one opening of a cover or a hollow body end side, wherein the film resistors are fixed in the at least one opening, and wherein two film resistors have resistance values differing by one to three orders of magnitude.

12. The measurement device according to claim 11, wherein two of the film resistors are held on a common ceramic substrate in the at least one opening.

13. The measurement device according to claim 11, wherein two of the film resistors are arranged on respective ceramic substrates and the ceramic substrates are each fixed in the at least one opening.

14. The measurement device according to claim 11, wherein a surface area of the at least one opening is smaller by one to five orders of magnitude than an area of the cover surface or the end side.

15. The measurement device according to claim 11, wherein the cover is disk-shaped.

16. The measurement device according to claim 11, which is an anemometric measurement device of a flow sensor, wherein a temperature sensor and a heat output sensor are set in the carrier element, and wherein the temperature sensor comprises a temperature-measuring resistor and a heat conductor as platinum thin-film or thick-film resistors on a ceramic substrate.

17. The anemometric measurement device of a flow sensor according to claim 16, wherein the carrier element comprises a temperature-resistant, inorganic material having a continuous use temperature of at least 250° C.

18. The anemometric measurement device of a flow sensor according to claim 17, wherein the continuous use temperature is >400° C.

19. The anemometric measurement device of a flow sensor according to claim 16, wherein the temperature-measuring element and the heating element are arranged perpendicular to the carrier element for measuring a mass flow rate of a gaseous or fluid medium through a pipeline.

20. A method for self-cleaning an anemometric measurement device of a flow sensor, the anemometric measurement device comprising a temperature-measuring element and a heating element set in a carrier element, the method comprising providing the temperature-measuring element with a platinum thin-film resistor on a ceramic substrate for measuring temperature and heating the temperature-measuring element with an additional platinum thin-film resistor.

* * * * *